N. DE LONG.
FENDER.
APPLICATION FILED FEB. 11, 1918.
1,310,179.
Patented July 15, 1919.
3 SHEETS—SHEET 1.
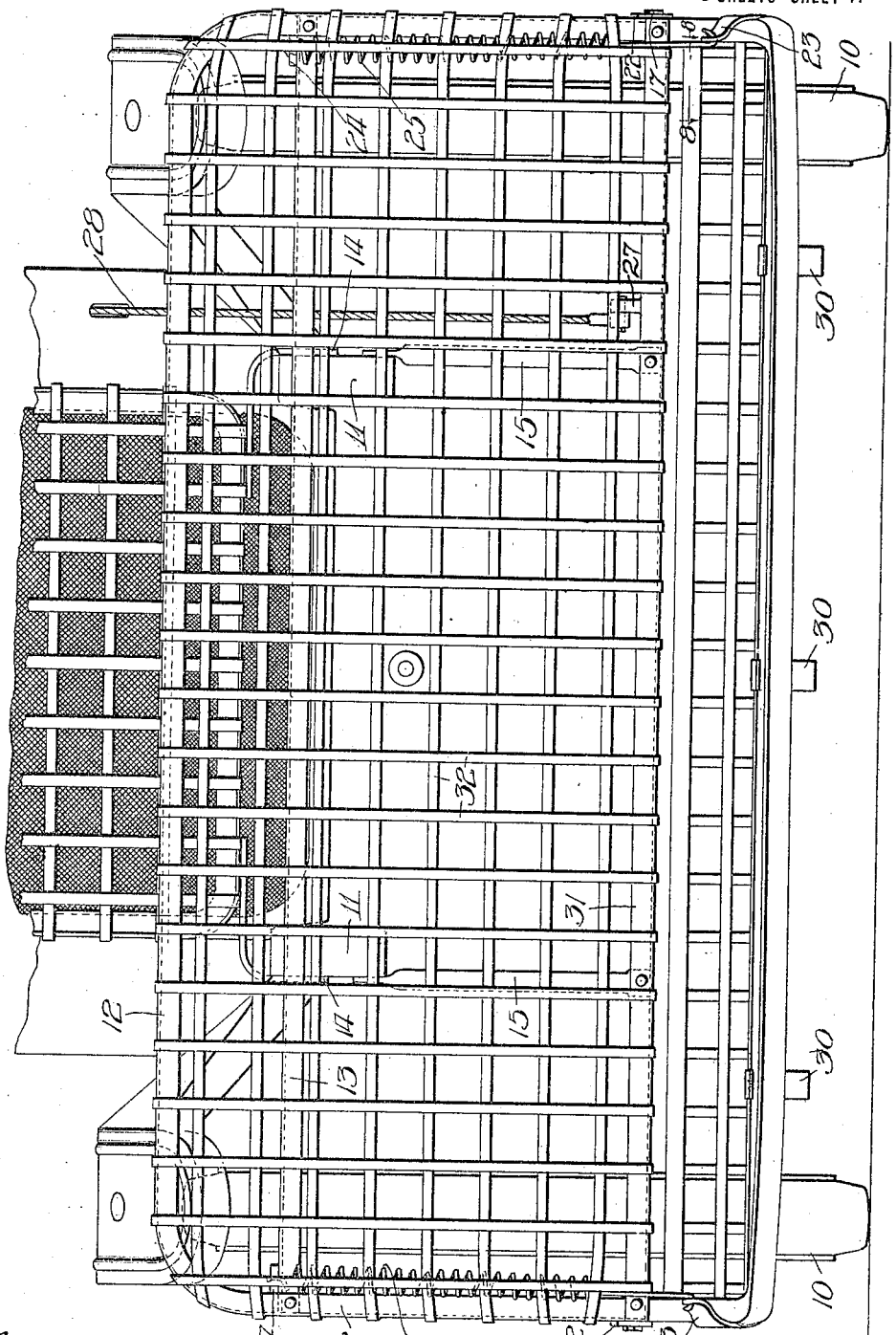

N. DE LONG.
FENDER.
APPLICATION FILED FEB. 11, 1918.
1,310,179.
Patented July 15, 1919.
3 SHEETS—SHEET 2.
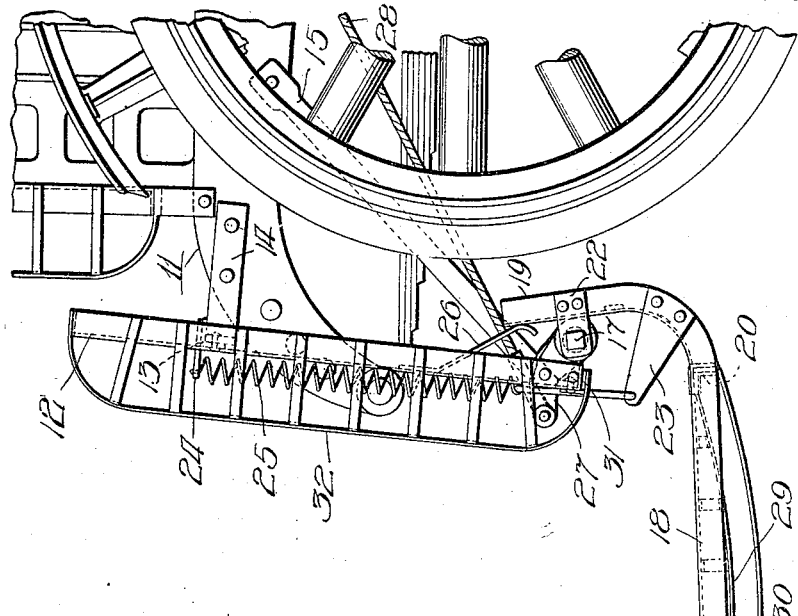
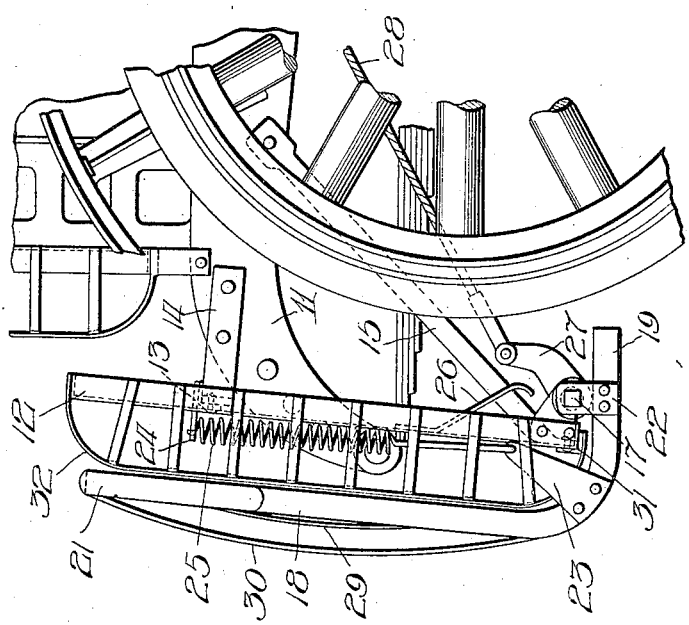
Witness:
Harry S. Gaither
Inventor
Nelson De Long
by Casper L. Redfield
Atty N. DE LONG.
FENDER.
APPLICATION FILED FEB. 11, 1918.
1,310,179.
Patented July 15, 1919.
3 SHEETS—SHEET 3.
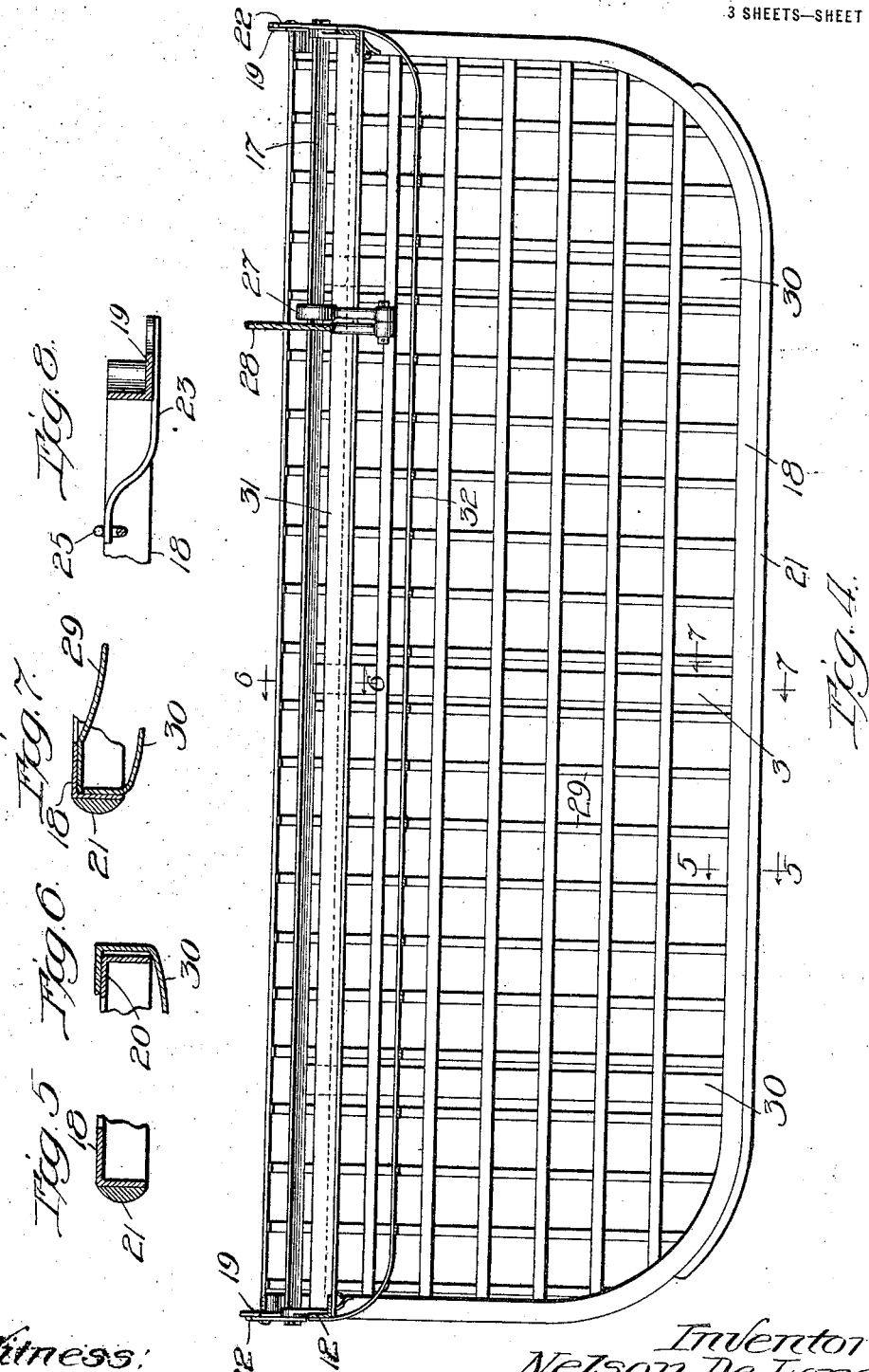
Witness:
Harry S. Gaither
Inventor:
Nelson De Long
by Casper L. Redfield Atty

UNITED STATES PATENT OFFICE.

NELSON DE LONG, OF CHICAGO, ILLINOIS, ASSIGNOR, BY DIRECT AND MESNE ASSIGNMENTS, TO J. M. LAVENTHAL, OF CHICAGO, ILLINOIS.

FENDER.

1,310,179. Specification of Letters Patent. Patented July 15, 1919.

Application filed February 11, 1918. Serial No. 216,467.

*To all whom it may concern:*

Be it known that I, NELSON DE LONG, a citizen of the United States of America, and a resident of the city of Chicago, county of Cook, and State of Illinois, have invented certain new and useful Improvements in Fenders, of which the following is a specification.

My invention relates to fenders, and has for its object improvements in devices of that kind.

In the accompanying drawings—

Figure 1 is a front elevation of my fender applied to an automobile;

Fig. 2 is a side elevation;

Fig 3 is a similar side elevation with the platform folded against the buffer;

Fig. 4 is a plan with the buffer in section;

Figs. 5, 6 and 7 are sections on lines 5—5, 6—6 and 7—7, respectively, of Fig. 4; and Fig. 8 is a section on line 8—8 of Fig. 1.

In the said drawings the automobile is represented by the wheels 10 and part of the frame 11.

The buffer consists of a rectangular frame 12 composed of angle irons, to which angle irons there is secured a lattice work of strap iron as shown in Fig. 1. Across an intermediate part of the frame 12 is an angle iron 13, and this angle iron is bolted to brackets 14 which in turn are bolted to the automobile frame 11. Diagonal braces 15 from the lower part of frame 12 to the frame 11 serve to hold the buffer in the position shown in the drawings.

Secured to the two lower corners of the buffer frame 12 are brackets 16 in which is supported a square shaft 17. This shaft has bearings and turns in these brackets.

The platform consists of a horizontal rectangular frame provided with lattice work similar to that used on the buffer. Three sides of this frame are bounded by an angle iron 18, the rear ends of which are bent upward as shown at 19 in Fig. 2. The fourth, or rear side of this rectangle is composed of an angle iron 20 shown in dotted lines in Fig. 2, and in section in Fig. 6. The front edge of the angle iron 18 is reinforced by a "half-round" bar 21.

Secured to the upstanding ends 19 are brackets 22 which have square holes fitting the ends of the square shaft 17. The shaft 17 is the pivotal support for the platform, and the relationship of this pivot to the platform is important in the successful operation of the device. Also secured to the upstanding ends 19, are arms 23 which are bent inward toward each other, and which extend forward beyond the pivoting shaft 17. Secured on the angle iron 13 are brackets 24, and between the arms 23 and brackets 24 are springs 25. The pull of these springs tend to raise the platform, but their tension is somewhat less than that necessary to support the platform in the position shown in Fig. 2. Secured to the buffer frame 12 are stiff leaf springs 26 which are engaged by the upper ends of the extensions 19 when the platform is in its lower position. These springs 26 serve as a yielding stop for the downward movement of the platform about its pivoting shaft 17. The relationship between springs 26 and ends 19 is such that when the forward end of the platform moves up and down (vibrates), there is a frictional sliding contact between 26 and 19 which tends to limit or destroy such vibration.

On the shaft 17 is an arm 27 which is connected by wire cable or rod 28 to a lever in the car in some place convenient for the driver to reach it. By a pull on the cable 28 the platform is turned on its pivot 17 and raised from the position shown in Fig. 2 to that shown in Fig. 3.

The lattice work of the platform is composed of thin bars of iron 29 which have their ends secured to angle irons 18 and 20 as shown in Figs. 2 and 7. The connections may be by riveting but are preferably by electric welding. Connected to the front inner face of the angle iron 18 by welding are three skid bars 30. (Figs. 2 and 7). The rear ends of these skids are not, however, rigidly connected to the bar 20. Instead, they are bent around bar 20 as shown in Fig. 6 and have a sliding connection at this point. If a load be thrown upon the platform, the front edge will be depressed by the turning of the platform about its pivot 17. When so depressed the skids 30 will strike the ground. These skids are in fact springs which are under initial tension to draw the looped end tightly against the angle iron 20. When they strike the ground under load they flatten out, the looped end sliding on angle iron 20 to permit such flattening. When the load is removed, the initial tension draws the loop back against angle iron 20.

Referring to Figs. 2 and 3, it will be seen that the pivoting center 17 is back of the buffer and above its lower end, and that the platform folds up to a position in front of the buffer and on the other side from that upon which it is pivoted. Of course it is not necessary that the lower end of the buffer extend below the pivot 17, but the construction is such that it can be extended down between the folded platform and the pivot on which the platform turns. The elevated position of the pivot 17 has two advantages. One is that it brings the folded platform to a high position so that it can clear fairly large sized obstructions in the road. The other relates to the operation of the platform as a catcher to pick up a person or object with which it collides.

When the front edge of the platform strikes an obstruction, the entire platform moves on the pivot 17 as a center. By drawing an arc with 17 as a center it will be seen that the front edge moves downward with respect to the ground and rearward with respect to the buffer. The downward movement of the front edge makes the platform into a scoop which tends to pick up the object with which it comes in contact, and the rearward movement mitigates the severity of the contact. In other words, the platform makes a yielding contact with the object which it strikes, the amount of yield being determined by the elevation of the pivot 17 above the front edge. This yield comes primarily against springs 25 and 26. If these are strained beyond a certain point, then springs 30 come into action.

By referring to Fig. 1 it will be seen that the brackets come to the angle iron bar 13 at considerable distances from each other and from the ends of said bar. The lower ends of the braces 15 connect to similar points on the angle iron bar 31 which is part of frame 12. By referring to Figs. 2 and 3 it will be seen that the bar 13 is back a good ways from the lattice work 32, which lattice work is curved and springy. When the buffer engages an obstruction, the shock is conveyed through the lattice to the frame 12, thence to the ends of the bar 13, and thence to brackets 14 and frame 11. None of these parts is absolutely rigid, and the overhang, doubled back on itself, is so great that the entire frame work constitutes a spring for absorbing shocks.

What I claim is:

1. In a fender for a vehicle, a vertically supported buffer, a platform normally supported in a substantially horizontal position, a pivot upon which said platform vibrates and upon which it may be turned for folding purposes, said pivot being supported on said buffer and located back of the rear face thereof, and manually operated means for turning said platform on its pivot to fold it, said platform being so constructed that when folded it lies against that face of the buffer which is opposite the face where the pivot is located.

2. In a fender, a platform, a pivotal support for said platform, a spring acting to support the platform in a horizontal position but having a tension less than that required to accomplish that result, and a second spring having a frictional contact with an extension on said platform and serving to furnish the extra force necessary to support the platform in a horizontal position, the friction between said second spring and said extension serving to check but not prevent vibration of the platform on its pivot.

3. In a fender for vehicles, a platform pivoted at one end, a spring furnishing part of the force necessary to support the platform in a horizontal position, a second spring furnishing the remainder of the necessary force and having a frictional contact with the platform to check but not prevent oscillation on the pivot, and a spring skid secured to said platform and serving as a yielding buffer when the platform is depressed sufficiently to come into contact with the surface on which the vehicle runs.

4. In the buffer of a fender, a rectangular frame, a yielding lattice work attached to said frame, a bar extending longitudinally across said frame at an intermediate point therein, and supporting brackets for the fender, said brackets being secured at intermediate points in said bar so that the bar of the frame work and the lattice work all form parts of a shock absorbing spring.

NELSON DE LONG.

Copies of this patent may be obtained for five cents each, by addressing the "Commissioner of Patents, Washington, D. C."